US005593549A

United States Patent [19]
Stirbl et al.

[11] Patent Number: 5,593,549
[45] Date of Patent: *Jan. 14, 1997

[54] METHOD FOR CHANGING SOLAR ENERGY DISTRIBUTION

[76] Inventors: Robert C. Stirbl, 247 Wadsworth Ave., New York, N.Y. 10033; Peter J. Wilk, 185 West End Ave., New York, N.Y. 10023

[*] Notice: The portion of the term of this patent subsequent to Dec. 14, 2010, has been disclaimed.

[21] Appl. No.: 159,690

[22] Filed: Nov. 30, 1993

Related U.S. Application Data

[63] Continuation-in-part of Ser. No. 70,680, Jun. 2, 1993, Pat. No. 5,269,288.

[51] Int. Cl.$^6$ ............... B01D 3/42; C02F 1/14; F24J 2/40
[52] U.S. Cl. ............ 203/10; 126/593; 126/683; 126/698; 159/903; 202/234; 202/DIG. 1; 202/100; 219/121.74; 219/121.85; 239/2.1
[58] Field of Search ............... 126/593, 683, 126/698, 700; 219/121.74, 121.85, 121.6; 136/259, 249, 258; 203/DIG. 1, 100, 10; 202/234

[56] References Cited

U.S. PATENT DOCUMENTS

| | | | |
|---|---|---|---|
| 4,164,718 | 8/1979 | Iwasaki | 342/4 |
| 4,171,695 | 10/1979 | Sletten | 126/683 |
| 4,183,612 | 1/1980 | Taucher | 126/683 |
| 4,307,711 | 12/1981 | Doundoulakis . | |
| 4,317,031 | 2/1982 | Findell | 126/577 |
| 4,364,532 | 12/1982 | Stark | 136/292 |
| 4,373,514 | 2/1983 | Lois | 126/583 |
| 4,419,533 | 12/1983 | Czubatyj | 136/259 |
| 4,691,994 | 9/1987 | Afian et al. | 126/698 |
| 4,849,851 | 7/1989 | Cubbison, Jr. | 361/220 |
| 5,005,958 | 4/1991 | Winston et al. | 126/685 |
| 5,089,055 | 2/1992 | Nakamura | 136/246 |
| 5,260,639 | 11/1993 | DeYoung et al. | 136/292 |

Primary Examiner—Virginia Manoharan
Attorney, Agent, or Firm—McAulay Fisher Nissen Goldberg & Kiel, LLP

[57] ABSTRACT

In a method for concentrating solar energy waveform energy is directed to a predetermined region of the atmosphere located a pre-established distance above a surface of the earth. The directing of the energy is controlled so as to modulate an index of refraction of air in the predetermined region of the atmosphere to produce a predetermined refraction index pattern in the region. The distribution of solar radiation is modified as it passes through the atmospheric region to thereby concentrate the solar radiation at a predetermined location.

33 Claims, 6 Drawing Sheets

5,593,549

METHOD FOR CHANGING SOLAR ENERGY DISTRIBUTION

CROSS-REFERENCE TO RELATED APPLICATION

This application is a continuation-in-part of U.S. patent application Ser. No. 08/070,680 filed Jun. 2, 1993, now U.S. Pat. No. 5,269,288.

BACKGROUND OF THE INVENTION

This invention relates to techniques for altering the distribution of solar energy falling on the earth's surface. More particularly, but not exclusively, this invention is related to methodology for concentrating solar energy.

It is well known that, with the exception of nuclear power, all of the energy on the earth originates with the sun. Extensive efforts in recent decades have been directed to harnassing solar radiation. Such efforts have resulted in huge mirrors erected on the earth's surface for concentrating incoming solar radiation on energy collectors. Another result of the continuing interest in solar energy is the development of solar cells and the arrangement of such cells in different configurations to convert the solar radiation into electricity. Yet another area of development in the field of solar energy is solar panels for converting solar radiation into heat energy.

One well known natural phenomenon is the bending of light waves by heated air. Light refracting convection currents are observable, for example, over road surfaces. The convection currents cause a shimmering or wavering effect in the perception of distant objects across roads or other heated surfaces.

The problem with such convection currents, as other natural phenomena, is that they are essentially uncontrollable. The variation in the index of refraction caused by localized heating of earth bound surfaces is random and unpredictable.

OBJECTS OF THE INVENTION

An object of the present invention is to provide a new method for concentrating solar radiation to enable conversion of the incoming solar energy into a form more readily utilizable for the purposes of mankind.

A related object of the present invention is to provide such a method for concentrating and directing solar radiation at selectable locations on the earth's surface or in the atmosphere, for purposes of changing climatic conditions in a predetermined region.

Another, more particular, object of the present invention is to provide such a method which controls the atmospheric index of refraction profile within a predetermined region of the earth's atmosphere to thereby redistribute incoming solar radiation so as to concentrate the radiation at a pre-established location.

A further particular object of the present invention is to provide such a method which at least partially compensates for atmospheric turbulence.

Yet another particular object of the present invention is to provide such a method in which atmospheric turbulence is compensated in real time via a feedback loop.

These and other objects of the present invention will be apparent from the drawings and detailed descriptions herein.

SUMMARY OF THE INVENTION

A method for concentrating solar energy comprises, in accordance with the present invention, the steps of (a) generating waveform energy, (b) directing the energy to a predetermined region of the atmosphere located a pre-established distance above a surface of the earth, (c) controlling the step of directing to modulate an index of refraction of air in the predetermined region of the atmosphere to produce a predetermined refraction index pattern in the region, and (d) modifying the distribution of solar radiation passing through the region to thereby concentrate the solar radiation at a predetermined location.

According to another feature of the present invention, the method further comprises the steps of absorbing, at the predetermined location, a substantial quantity of the concentrated solar radiation and converting at least a significant portion of the absorbed concentrated solar radiation to a different form of energy. Where the second form of energy is heat energy, the method may further comprise the step of altering a climatic condition in a region proximate to the location in response to the steps of absorption of the concentrated solar radiation. For example, the concentrated solar energy may be directed to impinge upon ice in a blocked river, lake or other body of water. The solar energy melts the ice to open up a blocked waterway.

Another climatic condition alterable in accordance with the present invention is humidity. Concentrated solar energy falling upon a body of water, such as the sea or a lake, can rapidly increase the humidity in a region bounding the heated water. Such a marked increase in humidity can reduce the chances of fire in dried coastal areas. In addition, under proper climatic conditions, it may be possible to generate rain over proximate land areas. Steps may be taken in accordance with the present invention to create the desired climatic conditions. For example, to ensure that water vapor in a rising column of air falls as rain over a desired area, a relatively cool region on or over the earth's surface may be created by modifying the atmospheric index of refraction to generate a diverging lens to reduce the amount of sunlight falling over a predetermined area.

Increasing the amount of sunlight falling over a selected area may be used to accelerate drying of wet surfaces in that selected area, for example, a playing field or race track. In addition, solar energy concentrated in accordance with the present invention may be used for controlling the spread of forest fires by causing fire breaks as in conventional fire fighting procedures.

According to another, alternative, feature of the present invention, the concentrated solar energy may be converted into a chemically stored form. The concentrated solar energy is absorbed and converted into chemical bonds of energy laden molecules, for example, via photosynthetic reactions. In brief, the instant invention can be used to stimulate plant growth, for example, in farming areas. Where the farm land is coastal, the above-described method for increasing rainfall may also be used.

According to a further feature of the present invention, the concentrated solar energy may be converted directly into electrical energy via photovoltaic cells. Alternatively, the concentrated solar energy may be converted indirectly into electrical energy, for example, by generating steam which is used to operate steam turbines.

According to yet another feature of the present invention, incoming solar radiation may be concentrated in or alongside an atmospheric whirlpool for purposes of causing the whirlpool to dissipate. More specifically, a plurality of atmospheric solar concentrators may be generated for heating air along the outer periphery of a hurricane, thereby producing a plurality of ancillary whirlpools acting to oppose the circulation of air in the primary whirlpool, i.e., the hurricane.

According to an additional feature of the present invention, the concentrated solar radiation is directed to and absorbed in a body of salt water at the predetermined location. The consequently evaporated water is captured or collected to form an aqueous distillate. The salt water may be transported, e.g., by pumps and pipelines, over the desert to the predetermined location well inside the boundaries of a desert region. The separated salt may be collected and transported back to the sea.

According to another feature of the present invention, the waveform energy is electromagnetic radiation which is generated by operating a laser. The modulation control is effectuated by concentrating the laser generated radiation differentially through the atmospheric region.

The refractive index modulation in accordance with the present invention is accomplished primarily by differential heating of the air in the predetermined target region of the atmosphere. However, it is also possible that the modulation is accomplished in whole or in part by ionizing the air within the atmospheric target region.

The refractive index profile of the air in the atmospheric target region may be modulated so as to produce a solar energy concentrator in the form of an atmospheric lens. More specifically, the index of refraction may be modulated so as to produce an atmospheric index profile approximating a Fresnel lens. It is to be noted that the lens may be or virtually any size, whereby the lens may be adapted to the particular application. Commercial solar energy collection by power companies or the production of rain, for example, may call for larger lenses. However, it is to be noted, that several interspaced atmospheric lenses may be generated, focusing the sun's energy onto the same collection or absorption area.

According to one embodiment of the present invention, laser radiation is transmitted from a plurality of different sources to the atmospheric target region. Accordingly, a plurality of lasers may generate different portions of the same concentrator or lens.

It is to be noted that an atmospheric solar concentrator generated in accordance with the present invention will be effective even if the lens is partial or imperfect. It is only necessary that incoming solar radiation be concentrated onto an absorption area. It is not necessary to produce an atmospheric lens capable of image formation. Accordingly, in this specification, the term "atmospheric lens" is used to mean an atmospheric index of refraction profile capable of concentrating incoming solar radiation onto a predetermined solar absorption location. Generally, the absorption area is located on the earth's surface, i.e., is an earth bound collector such as a steam generator which is connected to turbines, etc. In some minor applications, the collector may be on a ship, submarine, balloon or other sea- or airborne device. The collector may even be a satellite in orbit around the earth.

Concomitantly, it is contemplated that the laser or lasers which generate the atmospheric lens are located on the earth's surface. However, it is also within the contemplation of the invention that a lens generating laser is carried on a boat, submarine, balloon, airship or satellite.

Where there is a plurality of laser sources, the laser radiation may be simultaneously transmitted from those sources to the same point in the atmospheric target region.

Thus, in this embodiment of the invention, each laser in itself generates insufficient energy to ionize or substantially heat the air, while the energy from a plurality of lasers, when converging or crossing at the same target point in the atmosphere, will be sufficient to heat or ionize the air to change the index of refraction at that point. The laser sources may be phase locked to enable and optimize energy absorption at the atmospheric target point.

It is to be noted that the energy density of the individual laser beams may be decreased to a tolerable level (a level insufficient to ionize) by so called beam expanders.

If a single beam of laser radiation of Gaussian waist radia $w_a$ is sufficiently powerful to modulate the index of refraction of air, that beam waist radius $w_a$ is preferably enlarged or expanded for transmission through the atmosphere. In addition, the expanded beam is acted upon by either active or passive focusing optics, e.g., lenses and/or mirrors, to cause a convergence of the beam so that it is focused at a preselected point in the atmospheric target region. Of course, if several beams are used, one or more of them may be subjected to expansion and focusing steps.

According to another feature of the present invention, one or more lens generating laser beams are swept along a predetermined path through the atmospheric target region. This procedure is especially effective in the event that the atmospheric lens is a Fresnel lens. To generate each zone of the Fresnel lens, a laser beam distribution profile may be formed with a power gradient, the beam having a corresponding gradient at the region of the lens being generated.

Preferably, to optimize the concentration of solar radiation, adaptive optics is utilized to compensate for changes in atmospheric refractive index arising from atmospheric turbulence in the target region of the atmosphere. In general, adaptive optics is used in a predictive soalr point spread feedback loop to compensate for variations in the atmospheric refractive index profile in real time. More particularly, the modified spatio-temporal Fourier transform of an instantaneous atmospheric refractive index profile is iteratively measured for the atmospheric region at the predetermined absorption area, and in response to the measured profile, the intensity of laser radiation transmitted to the atmospheric region is varied. The turbulence compensation may be implemented by iteratively changing piston-and-tilt orientations of a plurality of adaptively deformable mirror segments disposed in a radiation transmission path between a laser and the target region in the atmosphere.

A method in accordance with the present invention may further comprise the steps of providing an internally reflecting tube having an inlet aperture larger than or matched with a collecting cone numerical aperture of the atmospheric lens at one end and an output aperture at an opposite end, effectively tapering the forward propagating rays of the concentrated solar radiation at the inlet aperture of the tube, guiding the concentrated solar radiation along the tube to the outlet aperture, and directing the concentrated solar radiation from the outlet aperture of the internally reflecting tube to a preselected point. In accordance with further specific features of the invention, the concentrated solar radiation may be focused by a lens at the outlet aperture of the tube. Also, the tube may be bent to extend through a curved bore in the earth or a large man-made structure. According, the concentrated solar radiation may be used for supplying energy to locations deep within the earth, under the sea, or within a building. The energy may be sufficiently intense to liquify heated coal and shale, carve or fracture rock during mining or tunneling operations.

As mentioned hereinabove, the present invention may be used for decreasing the amount of solar radiation which would naturally fall on a predetermined area. Accordingly, a method for shading a predetermined area from the effects of solar radiation comprises the steps of (i) generating waveform energy, (ii) directing the energy to a predetermined region of the atmosphere located a pre-established distance above a surface of the earth, (iii) controlling the step of directing to modulate an index of refraction of air in the predetermined region of the atmosphere to produce a predetermined refraction index pattern in the region, and (iv) modifying the distribution of solar radiation passing through the region to thereby divert at least a portion of the incoming solar radiation from falling within a predetermined area. The result of this method is to cool the predetermined area. Where the area is a skiing resort, the cooling may be effective to maintain the ski slopes in a suitably snow-covered state.

In another embodiment, the present invention generates a Fresnel lens in a sheet of moving liquid. This embodiment of the invention includes the steps of (1) generating waveform energy, (2) guiding liquid to flow in a plane along a pre-established path, (3) directing the energy to a predetermined region of the pre-established path, (4) controlling the step of directing to modulate an index of refraction of the liquid in the predetermined region of the pre-established flow path to produce a predetermined refraction index pattern of the liquid in the region, and (5) modifying the distribution of solar radiation passing through the region to thereby concentrate the solar radiation at a predetermined location. The liquid used in the sheet may be a glycol or an oil.

As in other embodiments of the invention, the waveform energy is preferably electromagnetic radiation and the step of generating includes the step of generating the electromagnetic radiation via a laser. The step of controlling includes the step of concentrating the laser generated radiation differentially throughout the region. The step of controlling includes the step of differentially heating the liquid in the region. The step of differentially heating includes the step of controlling the heating to produce a Fresnel or surface gradient type lens.

Pursuant to another feature of the present invention, the step of guiding includes the steps of providing a planar support and guiding the liquid to flow along the support. Alternatively, the step of guiding includes the steps of providing a nozzle with an elongate mouth and dispensing the liquid through the mouth so that the liquid falls in a planar sheet.

The lens generating radiation source, the directing components, the control algorithms and componentry, the sensors and the turbulence compensation circuitry and software are preferably on the earth's surface and fixed thereto. However, it is possible that one or more of these components are provided in an air vessel(s) or sea-going ship(s) and/or satellite(s).

A method and an associated system in accordance with the present invention provide a relatively inexpensive source of power. Solar radiation which since the beginning of time has fallen on the sides of buildings or on useless ground (desert, semi-arid regions, bodies of water, etc.) can now be harnessed to fall on designated areas, specifically a solar energy collector. Significant solar energy can be concentrated even if the atmospheric lens is only twenty or thirty feet in diameter and is located two or three hundred feet above the earth's surface. The amount of energy passing through the cross-section of such a lens and which is concentrated onto the designated spot can be readily calculated. Of course, greater amounts of solar energy may be concentrated by increasing the size of the atmospheric lens and/or the distance of the lens from the surface of the earth. Different spaced lenses or lens segments may be simultaneously generated for concentrating solar energy on the same area. Lenses may be generated successively in different regions of the atmosphere, thereby allowing for atmospheric relaxation before further attempts at index modulation.

A method for concentrating solar radiation in accordance with the present invention enables control of climactic conditions on a scale hitherto impossible. Solar energy is diverted to fall on preselected locations to increase humidity, cause rainfall, fight forest fires, accelerate plant growth, dissipate hurricanes, etc.

A method for concentrating solar radiation in accordance with the present invention also enables the generation of electrical power from sunlight, e.g., directly through densely packed photoelectric transducer arrays or indirectly via steam generation and turbine driving or other well known thermoelectric transduction modalities.

DETAILED DESCRIPTION

Figure 1:
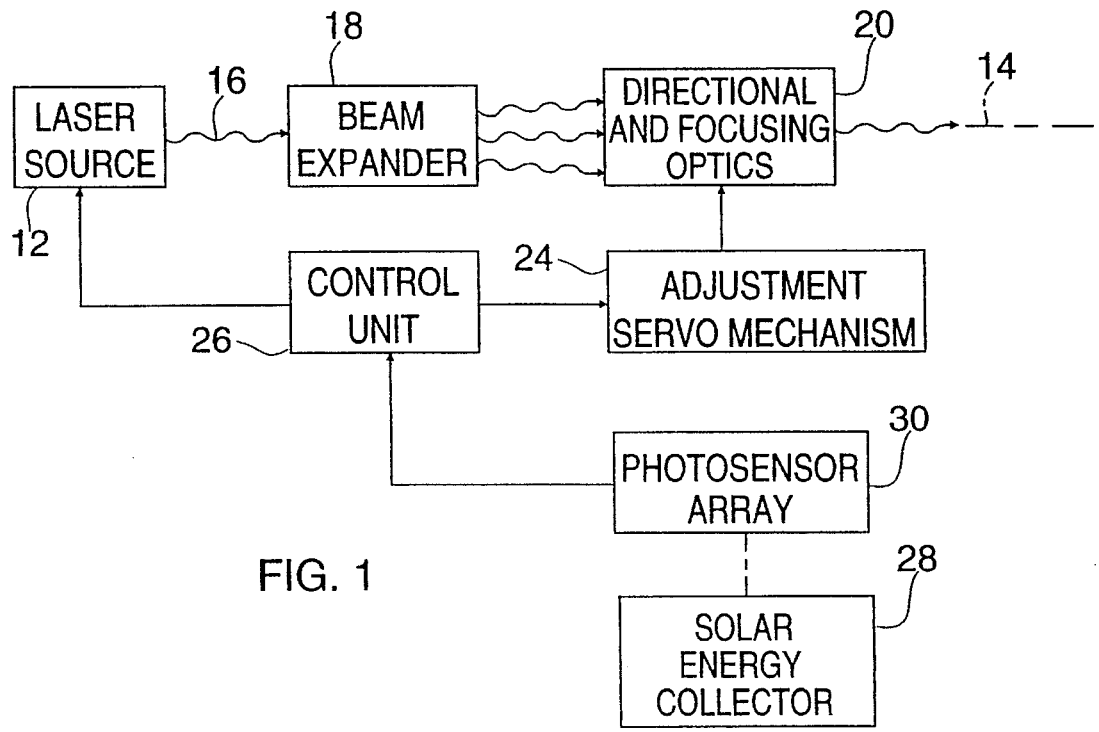
FIG. 1 is a block diagram of a system in accordance with the present invention for generating a predetermined refractive index pattern in a predetermined target region of the atmosphere for purposes of concentrating incoming solar radiation.

As illustrated in FIG. 1, a system for collecting solar radiation comprises a laser source 12 for emitting, along a schematically represented preselected path 14, laser radiation 16 having a wavelength absorbable by at least one type of atmospheric molecule. Because the power of laser beam or radiation 16, when emitted from a single source 12, must be sufficiently high to substantially heat or even ionize air, the beam must be expanded by a beam expander 18 prior to transmission through the atmosphere to a target region.

As further illustrated in FIG. 1, radiation directing and focusing optics 20 such as lenses or mirrors (see FIGS. 3 and 4) are disposed in the transmission path 14 for directing the radiation from source 12 to a predetermined atmospheric target 22 (FIG. 2) located a pre-established distance d1 above the earth. A servomechanism assembly 24 responsive to a control unit 26 is operatively connected to the radiation directing and focusing optics 20. Under the control of unit 26, servomechanism assembly 24 adjusts the operation of optics 20 to modulate an index of refraction of air in target region 22 to produce in that region a predetermined refractive index pattern or profile for concentrating incoming solar radiation on a solar energy collector 28.

In subsequent cycles of operation of the system of FIG. 1, when the index of refraction in target region 22 is again modulated to regenerate the desired refractive index pattern or profile, control unit 26 receives feedback from a photosensor array 30 and, in response to that feedback, adjusts the transmission of laser radiation 16 to compensate for atmospheric turbulence in target region 22, as well as in an underlying air volume.

Control unit 26 may be operatively connected to source 12 for timing the emission of radiation therefrom. Thus, source 12 may be energized only during operating cycles of the index modulation system of FIG. 1.

Figure 2:
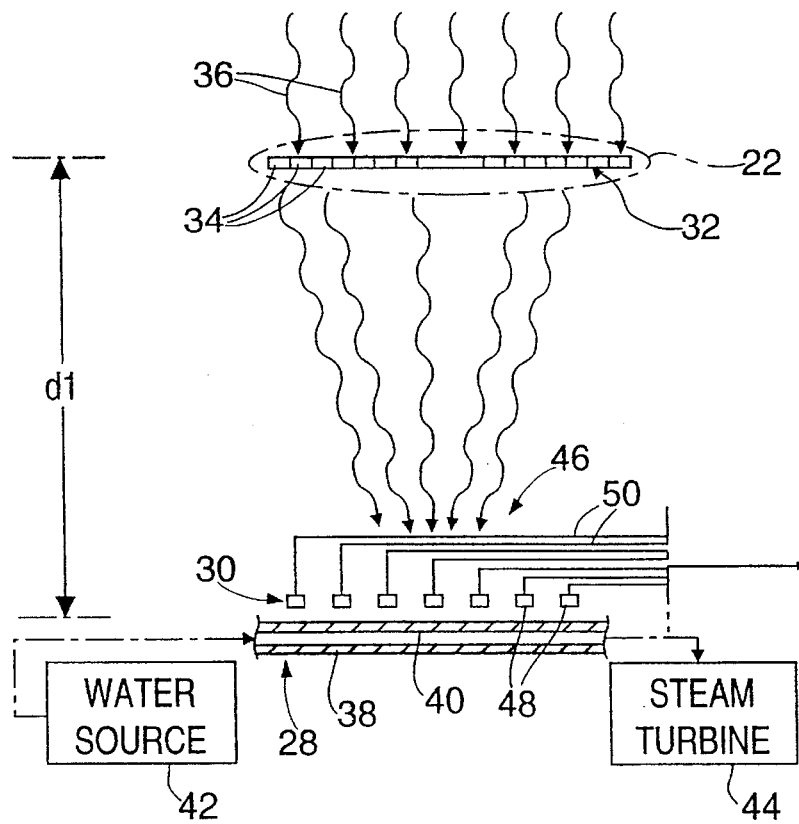
FIG. 2 is a diagram showing an atmospheric Fresnel lens generated by the system of FIG. 1 and further showing a solar energy collector and a photosensor array illustrated in FIG. 1.

As illustrated schematically in FIG. 2, the index modulation system of FIG. 1 acts to generate in target region 22 an atmospheric Fresnel or alternate distribution concentrating lens 32 having a plurality of sector or concentric scanned zones 34. Lens 32 is effective to concentrate incoming solar radiation 36 on solar energy collector 28. Collector 28 may take any conventional form where heat energy is absorbed and conveyed away to perform a useful function. For example, collector 28 may comprise a boiler with a metallic plate 38 in thermal contact with a plurality of fluid guiding pipes or channels 40. Pipes 40 are connected at an input end, for example, to a water supply or source 42 and at an output end to a steam turbine 44. Water from supply 42 is turned into steam upon passing through a designated target area 46 onto which solar radiation is concentrated by atmospheric lens 32. It is to be understood that other working fluids or combination of thermal concentrating/storage media may be used in substitution for water.

Photosensor array 30 includes a multiplicity of photoelectric sensors 48 disposed in a planar array above collector 28, as indicated in FIG. 2. Photosensors 48 serve essentially to detect the distribution of radiation concentration by lens 32. Feedback circuits 50 operatively connect sensors 48 to control unit 26 which functions via servomechanism assembly 24 to modify the operation of optics 20 in response to signals from the sensors to compensate in real time for changes in atmospheric refractive index caused by turbulence or apparent sun motion with respect to the solar energy receiving area. This feedback loop serves therefore to optimize the concentration of solar radiation by lens 32 onto collector 28.

Figure 3:
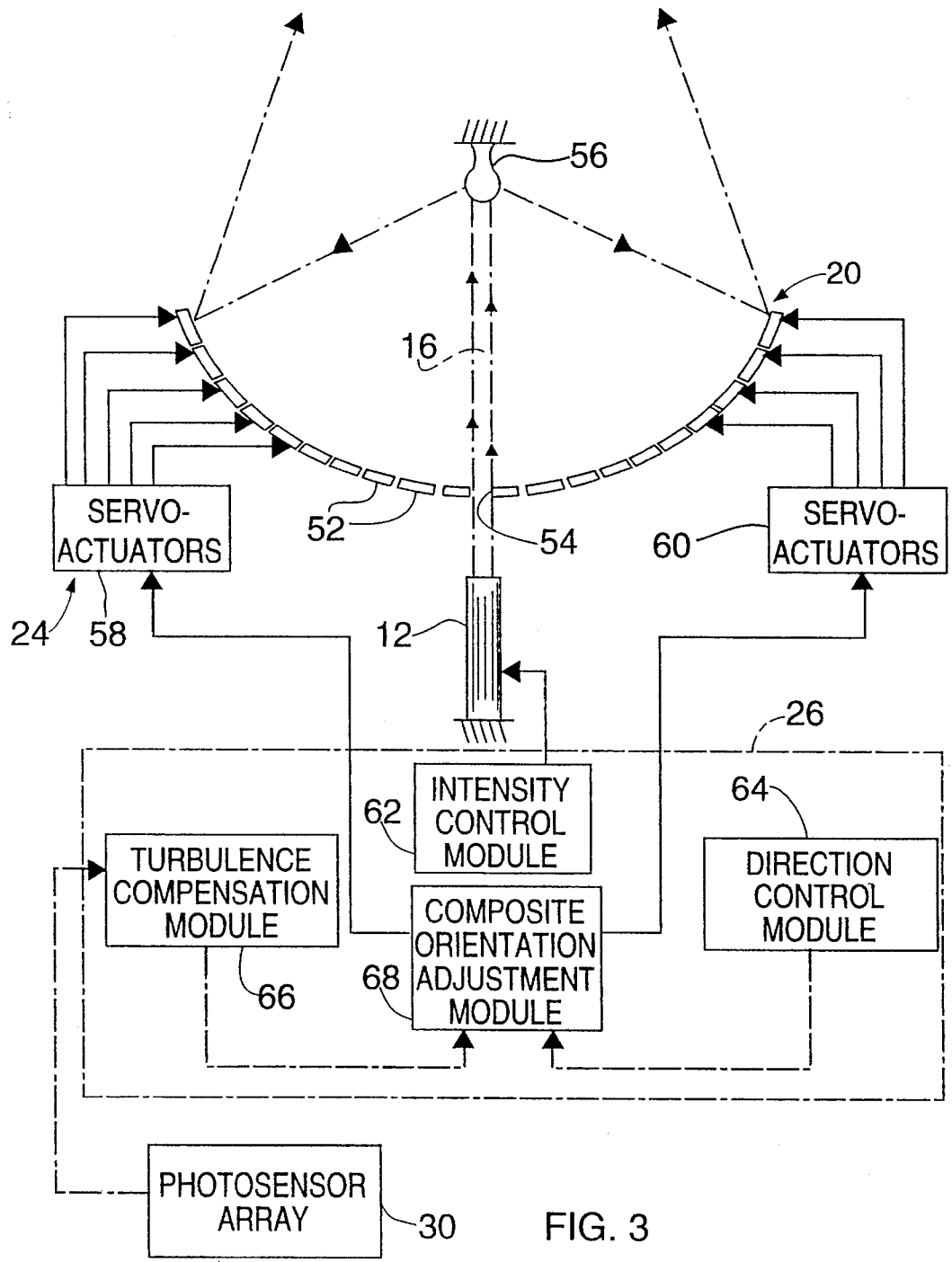
FIG. 3 is a diagram showing a specific embodiment of components illustrated in FIG. 1 including a control unit, directional and focusing optics, and a servomechanism assembly for adjusting the optics.

As shown in FIG. 3, optics 20 includes a plurality of deformable mirror segments 52 disposed in an aspheric concave array in the general surface form of a paraboloid. The deformable mirror array is formed with an aperture 54 through which laser beam 16 passes from laser source 12. Beam 16 is expanded by a convex mirror 56 disposed essentially at the focal point of mirror or mirror segments 52. Mirror 56 thus performs in part the function of beam expander 18 (FIG. 1). Mirror 56 also performs part of the directing function of optics 20.

As additionally shown in FIG. 2, servomechanism assembly 24 (FIG. 1) includes banks of servomechanism actuators 58 and 60 operatively linked to mirror or mirror segments 52 (or to mirror actuators). Generally, each mirror 52 will have one or more dedicated servo-actuators 58, 60 in the form, for example, of piezoelectric crystals. Actuators 58 and 60 function to control the instantaneous orientations of individual deformable mirror segments 52.

Control unit 26 includes a first module 62 for controlling the intensity of energy emitted from laser source 12. In particular, intensity control module 62 determines the times that laser source 12 is actively emitting laser radiation. Control unit 26 also includes a direction control module 64 for determining the orientations of mirror segments 52 necessary to sweep out zones 34 of Fresnel lens 32 (FIG. 2). In response to signals from control module 64, servo-actuators 58 and 60 tilt mirror segments 52 so that the expanded beam from mirror 56 converges to a predetermined point in the target region 22 (FIG. 2). That point shifts in time, for example, along an arc defining a zone 34 of lens 32.

Control unit 26 additionally includes a turbulence compensation module 66 which is operatively connected to servo-actuators 58 and 60 for controlling the operation thereof to adjust the orientation of mirror segments 52 (or mirror actuators) in response to signals from photosensors 48 (FIG. 2) to compensate in real time for changes in atmospheric refractive index induced by turbulence in target region 22. Turbulence compensation module includes circuitry or programming for controlling servo-actuators 58 and 60 to iteratively change the orientations of mirror segments 52.

Direction control module 64 and turbulence compensation module 66 are coupled at their outputs to a further module 68 serving to adjust or fine tune the mirror wavefront operations determined by direction control module 64 in accordance with the compensation requirements determined by module 66. Module 68 is connected to servo-actuators 58 and 60 to modify the orientations and positions of mirror segments 52 (or mirror actuators) to produce atmospheric Fresnel lens 32.

Intensity control module 62, direction control module 64 and composite orientation and position adjustment module 68, as well as turbulence compensation module, may be configured by hard wired circuits and/or specialized programming of a general purpose computer. In the event that the functions of modules 62, 64, 66 and 68 are programmed, the programming is a straightforward technical exercise for one of ordinary skill in the art of adaptive optics. Adaptive optics is used, for example, in astronomy, to adjust the orientations of the multiple individual deformable sections of segmented telescope mirrors to compensate in real time for atmospheric refractive index changes caused by turbulence and thereby obtain clear images of stellar bodies. The operation of turbulence compensation module 66 is essentially an operation in adaptive optics. Photosensor array 30 provides the feedback necessary to control instantaneous mirror orientation.

Figure 4:
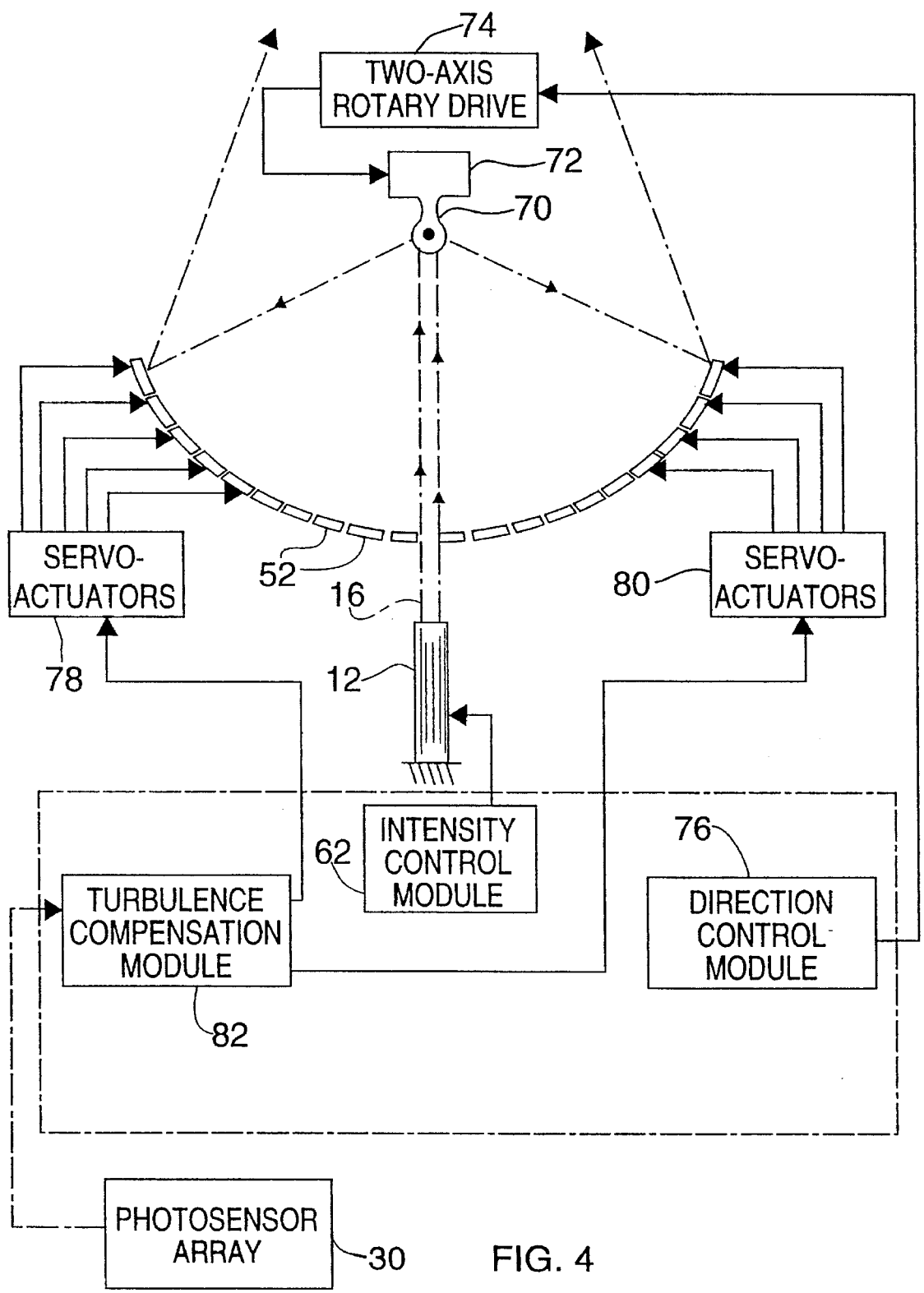
FIG. 4 is a diagram similar to FIG. 3 depicting an alternative embodiment of components illustrated in FIGS. 1 and 3.

In FIGS. 3 and 4, the same structures bear like reference designations. The embodiment illustrated in FIG. 4 separates, in optics 20, the turbulence compensation function from the overall directional function. Accordingly, a beam expanding mirror 70 is connected to a rotary carrier 72 which is operatively coupled to a two-axis rotary drive 74. Drive 74 is activated by a direction control module 76 which functions similarly to module 64 in the embodiment of FIG. 3. Via rotary carrier 72, control module 76 rotates mirror 70 in coordination with the emission of varying radiation intensities from laser source 12.

In the embodiment of FIG. 4, servo-actuators 78 and 80 are connected to respective deformable mirror segments 52 for adjusting the orientations thereof in response to signals from a turbulence compensation module 82 which functions similarly to corresponding module 66 in FIG. 3 to instantaneously compensate for the effects of atmospheric turbulence as detected by photosensor array 30.

Photosensors 48 cooperate with turbulence compensation module 66 or 82 to determine the sharpness or degree of concentration of the incoming solar energy. To that end, sensor array 30 advantageously extends over an area larger than the designated area 46 of impingement of the incoming concentrated molar radiation. Turbulence compensation module 66 or 82 uses signals from photosensors 48 to determine whether solar radiation is falling only on the designated target area 46 or is falling outside the designated area.

Figure 5:
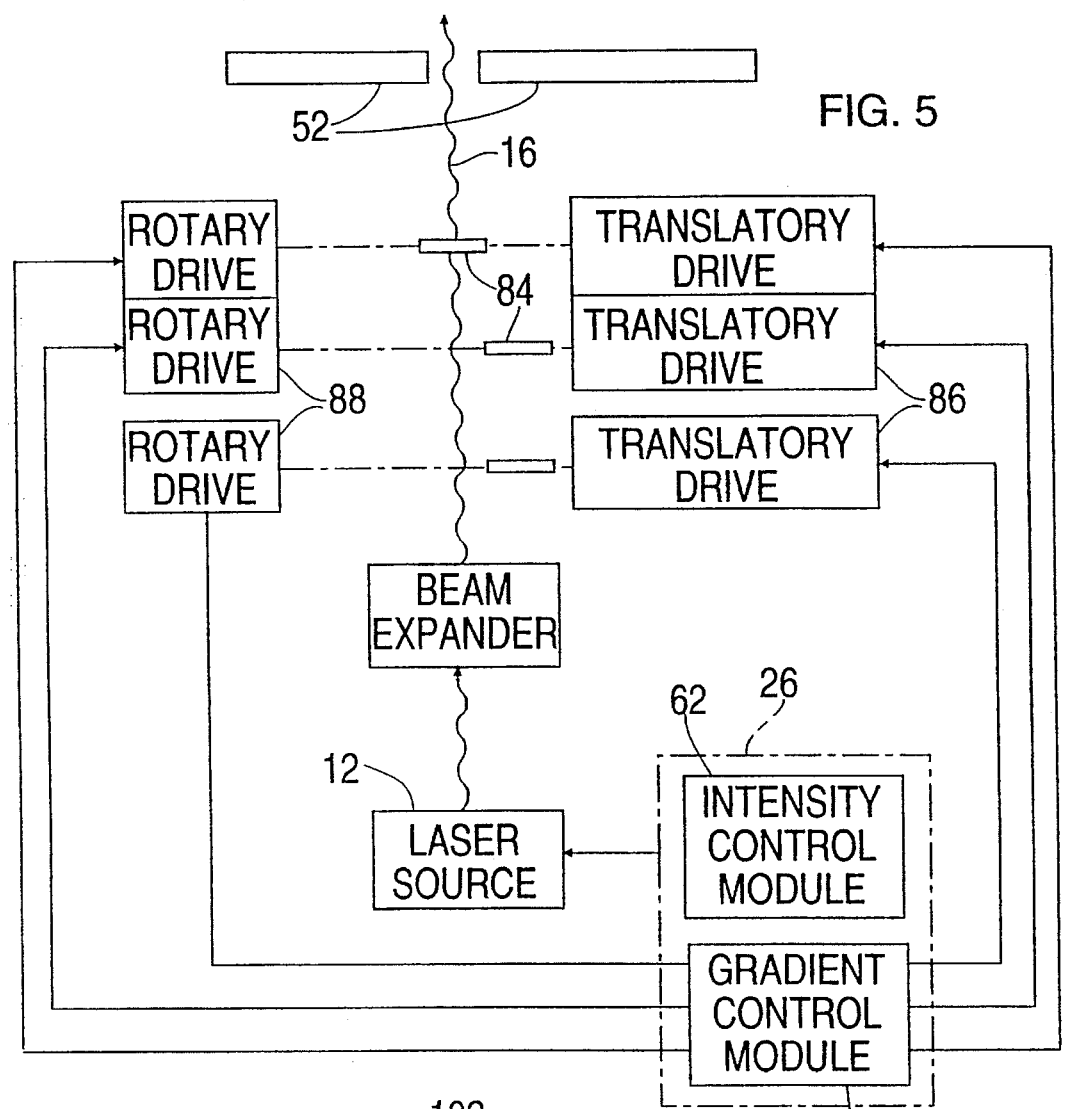
FIG. 5 is a block diagram illustrating a modification of the system of FIG. 3 or 4.

As in all Fresnel lenses, zones 34 of Fresnel or alternate distribution lens 32 have different refractive index gradients depending on the distance of the respective zones from the center of the respective lens. In one mode of operation, laser beam 16 can be used to sweep out a single zone 34 in a single pass. To achieve that end, it is necessary to provide beam 16 with an energy gradient corresponding to the desired index gradient of the particular lens zone 34. As illustrated in FIG. 5, a plurality of passive or active amplitude and/or phase filters 84 having respective power gradients are alternately disposable in the path of beam 16. Each complex filter 84 is an electronically constructed transform filter or a holographic phase filter connected to a respective linear or angular drive 86 for translating or reciprocating the filter with respect to the beam path. In addition, to account for the curvature of lens zones 34 about the center of lens 32, filters 84 are coupled with respective rotary drives 88. Upon insertion of a selected filter 84 into the beam path by the respective drive 86, the respective rotary drive 88 rotates the filter at a respective predetermined angular velocity.

Drives 86 and 88 are controlled by a gradient module 90 in control unit 26. In the event that the intensity of laser radiation 16 produced by source 12 is too great for ensuring the continued integrity of filters 84, beam 16 may be reimaged at a lower energy density by a beam expander 92 positioned upstream of filters 84. Filters 84 are in turn interdisposed upstream (or upbeam) of mirror segments 52.

Figure 6:
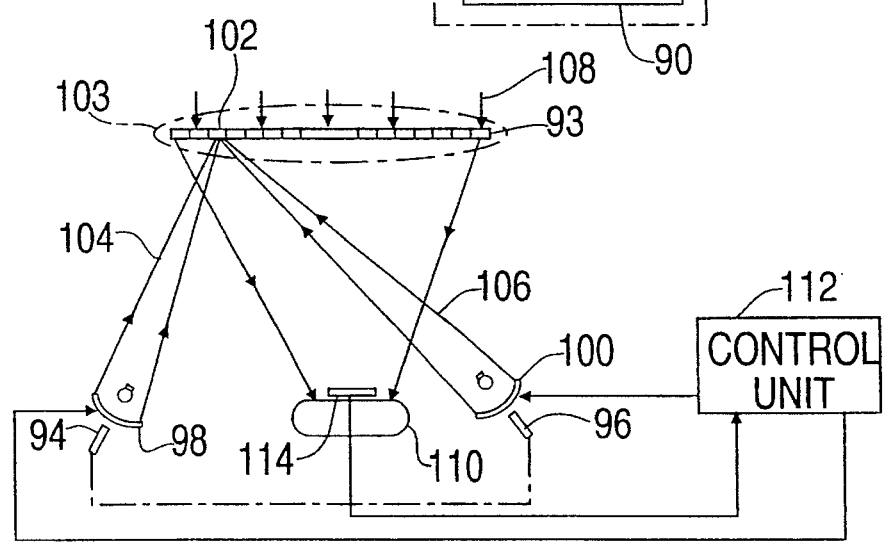
FIG. 6 is a diagram of yet another embodiment of the system of FIG. 1.

FIG. 6 depicts a modified system for generating an atmospheric Fresnel lens 93. A plurality of laser sources 94 and 96 are connected to one another via a phase-locking link 98. Each source 94 and 96 is provided with its own radiation directing and focusing optics 98 and 100.

As illustrated in FIG. 6, in one mode of operation, laser radiation is transmitted simultaneously from sources 94 and 96 to the same convergence point 102 in an atmospheric target region 104. Owing to the phase locking of laser sources 94 and 96, the intensities of beams 104 and 106 from those sources can be adjusted to coherently add (reconstructively) at the convergence point 102 or incoherently add their beam powers to generate sufficient energy to ionize or substantially heat the air at that point.

FIG. 6 shows beams 104 and 106 as expanded beams being focused to convergence point 102 by the respective optics 98 and 100. However, it is possible to dispense with optics 98 and 100, provided that laser sources 94 and 96 produce laser radiation which is insufficiently intense to significantly heat or ionize the atmosphere prior to convergence of beams 104 and 106 at point 102. Only when beams 104 and 106 cross or converge at point 102 do they have sufficient energy to significantly change the index of refraction of the air.

Fresnel or alternate distribution lens 93 concentrates incoming solar radiation 108 on a boiler 110. If necessary, atmospheric turbulence is compensated by a control unit 112 receiving feedback signals from a photosensor array 114 at collector or boiler 110. Control unit 112 adapts the operation of optics 98 and 100 to real time atmospheric conditions.

It is to be noted that the term "atmospheric lens" as used herein is intended to connote not an image forming lens but rather a refractive air volume of adequate structure to concentrate incoming solar rays upon a defined energy absorption or collection station. Such a refractive air volume is preferably in the form of a Fresnel or alternate distribution lens like structure. However, other shapes are also within the contemplation of the instant invention. For example, the heated or ionized air volume may have outwardly convex upper and lower boundaries.

Alternatively, the concentration of solar radiation on a collector may be accomplished by modulating the index of refraction in a predetermined region of the atmosphere to generate a diffraction pattern or volume serving to concentrate incoming radiation.

It is to be further noted that the radiation which is differentially focused in a predetermined pattern to produce the atmospheric lens may be any wavelength or range of wavelengths capable of being absorbed by one or more major atmospheric constituent molecules (e.g., water, carbon dioxide, oxygen, nitrogen, etc.) in sufficient quantities to effectuate a change in the refractive index of the air. For instance, microwave energy may be used.

In addition, the source or sources of the modulating radiation need not be on the earth's surface but may instead be located in hot air balloons or on satellites.

It is to be noted that a lens generating laser beam may be provided with an intensity gradient by other techniques equivalent to the filtering technique described hereinabove with respect to FIG. 5. For example, a laser beam may be differentially expanded so that some portions of the beam have a higher intensity than other portions. Such differential expansion may be accomplished by forming expander 56 or 70 with an assymetric surface.

Modifying the index of refraction in a predetermined region of the atmosphere with a laser as described in detail hereinabove can be used to either concentrate solar energy on an underlying area or to decrease the total amount of solar radiation falling on that area. In the former case, the atmospheric region acted upon by the laser becomes a solar energy concentrator, while in the latter case, the atmospheric region acted upon by the laser diverts the solar energy. In the former case, the target region of the atmosphere may take the form of a converging lens. In the latter case, the atmospheric target region becomes a diverging lens. In general, the result is to alter the otherwise natural distribution of solar radiation falling on the preselected area.

Concentrated solar radiation can be collected or absorbed by systems other than a boiler with a metallic plate 38 in thermal contact with a plurality of fluid (or thermal storage and transport media) guiding pipes or channels 40, as described above with reference to FIG. 2. For example, collector 110 (FIG. 6) may take the form of an array of densely packed photoelectric transducers or photocells which convert the incoming concentrated solar radiation directly to electrical current. In contrast, in the systems described hereinabove with reference to FIGS. 1–6, solar energy is converted into electrical energy indirectly by first being converted into heat energy which is used to drive turbines which then generate the electrical power output.

The collection or absorption of solar radiation concentrated by one or more laser-generated atmospheric lenses or diffraction gratings may be mediated by natural bodies instead of mad-made facilities. For example, a bed of ice in a river or lake may be the ultimate target of the concentrated solar radiation. Upon absorbing the concentrated solar radiation, the ice melts and opens up a waterway which had otherwise been blocked to desired human use.

Targeting natural bodies with solar energy concentrated by a laser-generated atmospheric lens or diffraction grating as described herein is useful for controlling or altering a climatic condition in a region at or proximate to the targeted natural body. An ice block in a river or other natural body of water is one example of altering a climatic condition. Another climatic condition alterable in accordance with the present invention is humidity. Concentrated solar energy falling upon a body of water, such as the sea or a lake, can rapidly increase the humidity in a region bounding the heated water. Such a marked increase in humidity can reduce the chances of fire in dried coastal areas. In addition, under proper climatic conditions, rain can be produced over land areas near the targeting body of water.

Where rainfall is a desired climatic change and humidity is elevated in a column of air rising from a body of water heated by concentrated solar radiation, the water vapor may be induced to precipitate by cooling a selected area of the earth in the path of movement of the humid air column. As mentioned above, cooling is effectuated by generating one or more diverging atmospheric lens to decrease the amount of sunlight falling on the selected area, thereby cooling that area relative to surrounding areas and particularly relative to the column of moisture laden air produced by an atmopheric solar concentrator. Of course, the energy for undertaking such climatic modifications as described herein can come from solar energy collection as described hereinabove with reference to FIGS. 1–6.

Another climactic use of the invention is to increase the amount of sunlight falling over a selected area, for example, to accelerate drying of wet surfaces in that selected area, for example, a playing field or race track. For such a use, the solar energy need not be intensely concentrated. In other uses, for example, to control the spread of forest fires by causing fire breaks as in conventional fire fighting procedures, the amount of energy must be larger.

Solar energy concentrated by an atmospheric lens may be converted into a chemically stored form. The concentrated solar energy is absorbed and converted into chemical bonds of energy laden molecules, for example, via photosynthetic reactions or some other photoreactive process. Specifically, the instant invention can be used to stimulate plant growth in dense farming areas by providing concentrated sunlight.

It is to be noted that in many applications, it will not be convenient to position photosensors 48 or 114 directly over the targeted solar absorption area. However, it is not necessary that the sensors be juxtaposed to the target area. Instead, photosensors 48 or 114 may be positioned to detect the distribution of light concentrated by lens 32 or 93 onto the photosensors from a distant calibration object other than the sun. This calibration object can be a planet, the moon, a satellite, a balloon, an airplane or other high-flying known source distribution. Accordingly, photosensors 48 or 114 may be spaced from the target region by a distance approximating the distance of the laser beam source 12, 94, or 96 from the targeted natural body or other energy absorption target.

Once again, it is to be noted that an atmospheric solar concentrator generated in accordance with the present invention will be effective even if the lens is partial or imperfect. It is only necessary that incoming solar radiation be concentrated onto an absorption area. It is not necessary to produce an atmospheric lens capable of image formation. Accordingly, in this specification, the term "atmospheric lens" is used to mean an atmospheric index of refraction profile capable of concentrating incoming solar radiation onto a predetermined solar absorption location.

Figure 7:
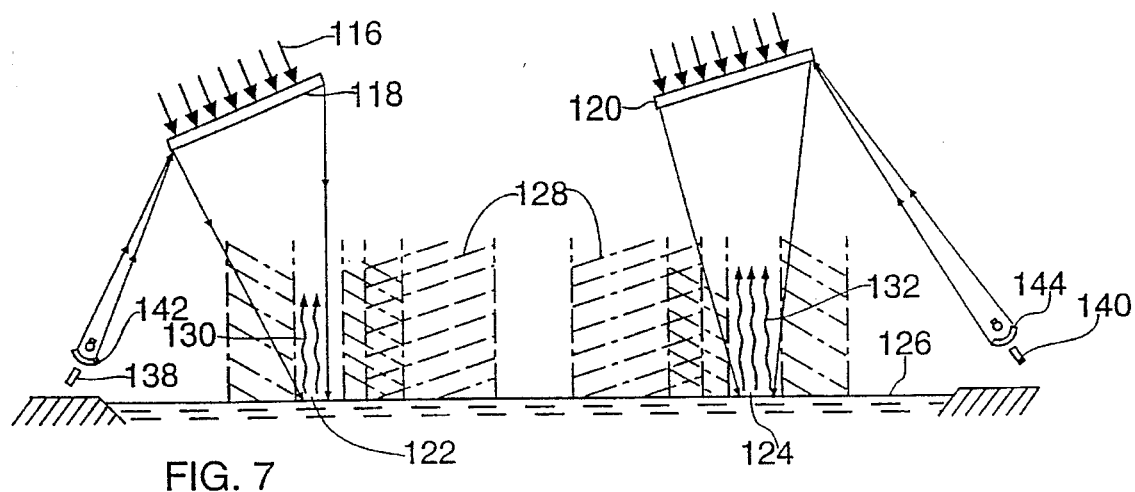
FIG. 7 is a diagram a pair of atmosperic solar concentrators in accordance with the present invention, generated for dissipating a hurricane type natural disturbance, indicated in side elevational view.
Figure 8:
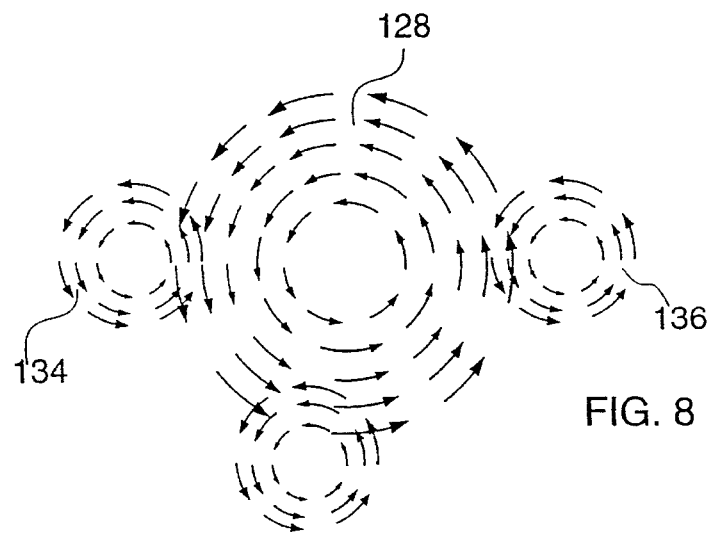
FIG. 8 is a diagram, in top view, of the hurricane type natural disturbance of FIG. 7, showing ancillary atmospheric whirlpools for counteracting and reducing the disturbance.

Yet another climactic change which may be induced by an atmospheric solar energy concentrator as described herein is the dissipation of whirlpool type storms, e.g., hurricanes. As illustrated in FIG. 7, incoming solar radiation 116 is concentrated by a plurality of atmospheric Fresnel type lenses 118 and 120 onto atmospheric regions 122 and 124 and/or at underlying surfaces of a body of water 126. The targeted atmospheric regions 122 and 124 and/or underlying water surfaces lie proximate to an outer periphery of a hurricane type natural disturbance 128. In response to incoming concentrated solar radiation, quickly rising columns 130 and 132 of air and water vapor are produced at the periphery of hurricane type natural disturbance 128. As illustrated in FIG. 8, the rising columns 130 and 132 of air and water vapor result in ancillary atmospheric whirlpools 134 and 136 which work against the air flow at the periphery of disturbance 128, thereby serving to counteract and dissipate the force of the hurricane. Fresnel type lenses 118 and 120 are generated by laser sources 138 and 140 and associated focusing elements 142 and 144.

Solar radiation concentrated by an atmospheric lens as described above may be directed to and absorbed in a body of salt water at the predetermined location. The body of salt water may be naturally occurring, e.g., a salt water lake or a sea, or it may be man-made. In the latter event, the salt water may have been transported from a distant sea via pipes or an aqueduct to a desert area. Water is evaporated from the body of salt water and captured or collected to form an aqueous distillate, which may be used for drinking, irrigating, etc. The separated salt may be collected and transported back to the sea.

Figure 9:
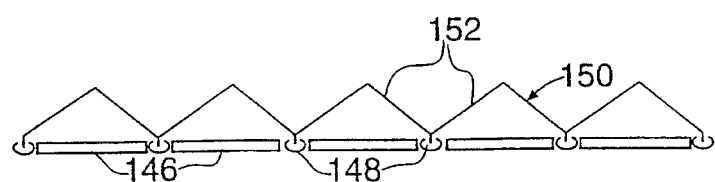
FIG. 9 is a schematic cross-sectional view of a water desalinization or distillation plant using an atmospheric solar concentrating lens as a power source, in accordance with the present invention.

As illustrated in FIG. 9, a water desalinization or distillation plant using an atmospheric solar concentrating lens as a power source comprises a plurality of flat tanks or evaporation pans 146 each flanked by a pair of slotted pipes 148. A roof 150 of transparent plastic webbing is supported over the pans 146 for providing a condensation surface for water evaporated from pans 146 as a consequence of concentrated solar radiation falling on the installation owing to an atmospheric lens. The aqueous condensate flows down panels 152 of roof 150 and is deposited into slotted pipes 148 for guidance thereby to a water collection station or storage facility (not shown). Roof panels 152 may be cooled to facilitate condensation. Power for cooling may be provided by solar energy collected as described hereinabove with reference to FIGS. 1–6.

Figure 10:
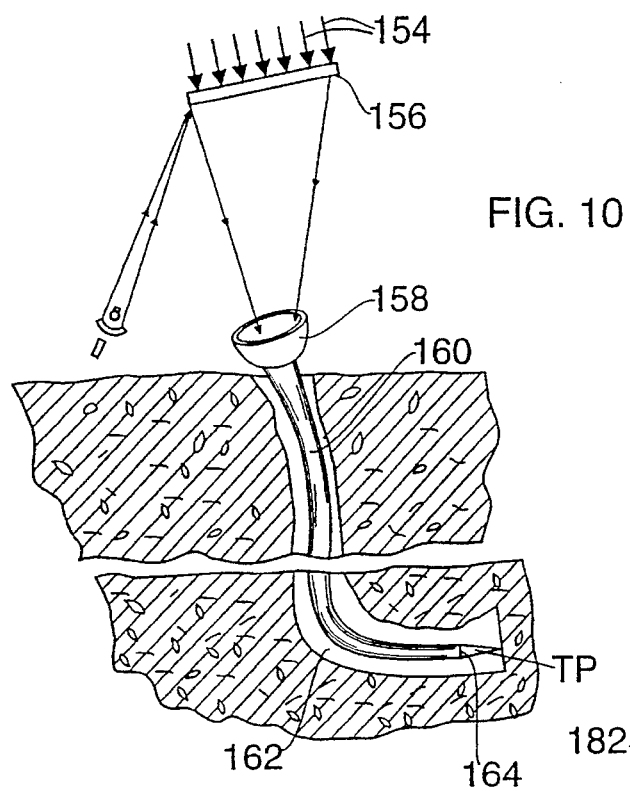
FIG. 10 is a schematic side elevational view of an internally mirrored tube for transmitting, to an underground or underwater location, solar radiation which has been effectively focused by an atmospheric concentrator.

As illustrated in FIG. 10, incoming solar radiation 154 may be focused or concentrated by an atmospheric concentrator 156 onto a cone-shaped input aperture 158 of an internally reflective (mirrored) tube 160. Tube 160, which may be flexible, extends through a curved hole or bore 162 in the earth. At an outlet aperture of tube 160, an optical element 164 serves to focus or concentrate on a desired target point TP the concentrated solar radiation which is guided along tube 160 from funnel-shaped input aperture 158. Of course, other optical elements may be provided at input aperture 158 for optimizing the transmission of electromagnetic waveform energy along tube 160.

To minimize back scattering and maximize efficiency of atmospheric solar concentrator 156 and tube 160, the angle of cone-shaped input aperture 158 should be greater than or equal to the cone angle of the incoming solar beam as focused by concentrator 159 at the inlet aperture 158. Thus, the forward propagating rays of the concentrated solar radiation are effectively tapered at inlet aperture 158 of tube 160.

Bore 162 may be formed at least in part by concentrated electromagnetic energy emerging from the outlet aperture of tube 160. Tube 160 enables the use of concentrated solar radiation for supplying energy to locations deep within the earth, under the sea, or within a building. The concentrated solar radiation may be sufficiently intense to liquify heated coal shale or to carve fractured rock during mining and tunneling operations.

As discussed above, an atmospheric index of refraction may be modified through a prescribed atmospheric region so as to generate a diverging less for decreasing the amount of solar radiation which would naturally fall on a predetermined area. The result of this method is to cool the predetermined area. Where the area is a skiing resort, the cooling may be effective to maintain the ski slopes in a suitably snow-covered state.

Figure 11:
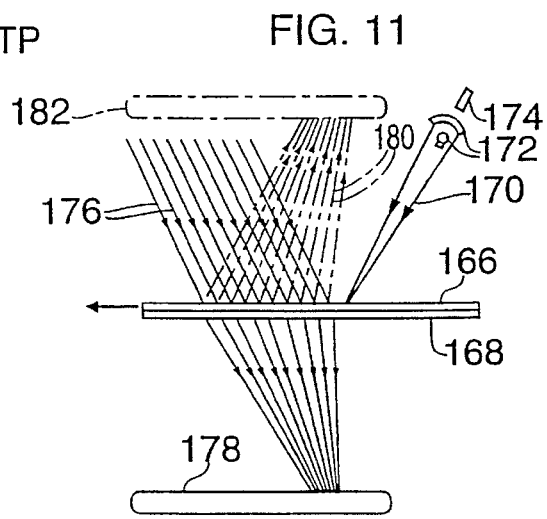
FIG. 11 is a diagram illustrating operation of a solar concentrator where the index of refraction of a moving liquid sheet is modified by a laser beam.

As depicted in FIG. 11, a sheet 166 of a liquid such as a glycol or an oil moves over a planar support 168 and is acted upon by a laser beam 170 transmitted via focusing elements 172 from a laser source 174. Focusing elements 172 and laser source 174 are automatically controlled, as described above, to direct beam 170 so that it impinges upon sheet 166 in a predetermined intensity pattern, thereby modifying the index of refraction of the moving liquid to produce a Fresnel lens. The Fresnel lens thus produced causes incoming solar rays 176 to converge and become concentrated upon a solar energy collector body 178, e.g., an elongate boiler or array of photoelectric cells. The collector body 178 is elongated in the direction of flow of sheet 166 to absorb solar energy concentrated by the Fresnel lens prior to the natural degeneration of the lens.

It is contemplated that a series of lenses or reflective surfaces are generated in sheet 166, one behind the other. The controller (not shown) may be programmed to generate the lenses with varying focal characteristics so that the solar rays 176 continue to be concentrated on collector body 178 even though the sun gradually changes its position in the sky.

In an alternative functioning of the system of FIG. 11, liquid sheet 166 or support 168 is reflective, while focusing elements 172 and laser source 174 are operated to modify the density of the moving liquid so as to change the surface curvature thereof. The surface curvature is controlled so as to reflect incoming solar rays 176 along paths 180 to an elongate collector body 182.

Where underlying support 168 is reflective and the liquid sheet 166 transparent, incoming solar radiation is differentially refracted through sheet 166, reflected from support 168, and again refracted through sheet 160, to be concentrated on solar energy collector body 182.

Generally, concentration of solar rays 176 is effectuated by refraction. The density of the liquid is modified so as to acquire a varying index or refraction.

Figure 12:
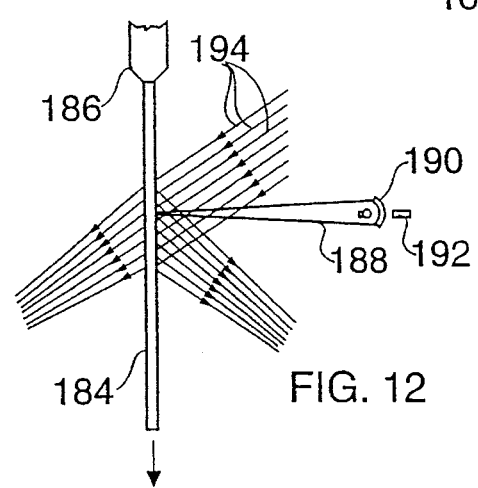
FIG. 12 is a diagram similar to FIG. 11, showing an alternate embodiment of the invention.

As shown in FIG. 12, a moving sheet 184 of glycol or some other transparent liquid is dispensed smoothly from an elongate nozzle 186. A laser beam 188 is transmitted via focusing elements 190 from a laser source 192. Focusing elements 190 and laser source 192 are automatically controlled, to direct beam 188 so that it impinges upon sheet 184 in a predetermined intensity pattern, thereby modifying the index of refraction of the moving liquid to produce a Fresnel lens. The Fresnel lens thus produced causes incoming solar rays 194 to converge and become concentrated upon a solar energy collector body (not shown), e.g., an elongate boiler or array of photoelectric cells. The collector body is elongated in the direction of flow of sheet 184 to absorb solar energy concentrated by the Fresnel lens prior to the natural degeneration of the lens.

Although the invention has been described in terms of particular embodiments and applications, one of ordinary skill in the art, in light of this teaching, can generate additional embodiments and modifications without departing from the spirit of or exceeding the scope of the claimed invention. For example, a solar concentrator in accordance with the present invention may be used for concentrating solar power on a vehicle such as a ship or a train for purposes of powering the vehicle. Accordingly, it is to be understood that the drawings and descriptions herein are profferred by way of example to facilitate comprehension of the invention and should not be construed to limit the scope thereof.

What is claimed is:

1. A method for concentrating solar energy, comprising the steps of:

generating waveform energy;

directing said energy to a predetermined region of the atmosphere located a pre-established distance above a surface of the earth;

controlling said step of directing to modulate an index of refraction of air in said predetermined region of the atmosphere to produce a predetermined refraction index pattern in said region; and modifying a distribution of solar radiation passing through said region to thereby concentrate the solar radiation at a predetermined location.

2. The method defined in claim 1, further comprising the steps of absorbing, at said location, a substantial quantity of the concentrated solar radiation and converting at least a significant portion of the absorbed concentrated solar radiation to a different form of energy.

3. The method defined in claim 1 wherein said location is in or proximate to an atmospheric whirlpool, whereby energy fed to said location induces said whirlpool to dissipate.

4. The method defined in claim 1, further comprising the steps of:

absorbing, in a body of salt water at said location, a substantial quantity of the concentrated solar radiation;

evaporating water from said body of salt water in response to said step of absorbing; and collecting the evaporated water to form a distillate.

5. The method defined in claim 1 wherein said waveform energy is electromagnetic radiation and said step of generating includes the step of generating said electromagnetic radiation via a laser, said step of controlling including the step of concentrating the laser generated radiation differentially through said region.

6. The method defined in claim 5 wherein said step of directing includes the step of transmitting laser radiation from a plurality of different sources to said region.

7. The method defined in claim 6 wherein said step of transmitting includes the step of transmitting the laser radiation simultaneously to the same point in said region, further comprising the step of phase locking said sources.

8. The method defined in claim 6 wherein said step of transmitting includes the step of transmitting laser radiation from said sources to different points in said region at any one time.

9. The method defined in claim 5, further comprising the step of expanding a beam of laser radiation produced during said step of generating, said step of directing including the step of transmitting the expanded beam through the atmosphere to said region, said step of controlling including the step of focusing the expanded beam to a point in said region.

10. The method defined in claim 9 wherein said step of controlling includes the step of sweeping the focused beam along a predetermined path through said region.

11. The method defined in claim 10 wherein said step of controlling further includes the step of generating a power gradient within said beam, the focused beam having a corresponding gradient.

12. The method defined in claim 5 wherein said step of controlling includes the step of utilizing adaptive optics to compensate for refractive index changes induced by atmospheric turbulence in said region.

13. The method defined in claim 12 wherein said step of utilizing adaptive optics includes the steps of:

detecting an effect of an instantaneous atmospheric refractive index profile for said region on a power distribution over an energy collecting area; and in response to said step of detecting, varying an intensity of laser radiation transmitted to said region to compensate for variations in said atmospheric refractive index profile in real time.

14. The method defined in claim 13 wherein said step of varying includes the step of iteratively changing orientations of a plurality of mirror segments disposed in a radiation transmission path between said laser and said region.

15. The method defined in claim 1 wherein said predetermined refraction index pattern is essentially an atmospheric lens in said region, said step of modifying including the step of refracting the incoming solar radiation through said lens.

16. The method defined in claim 15 wherein said step of controlling includes the step of controlling the index of refraction to produce a Fresnel atmospheric lens.

17. The method defined in claim 1 wherein said step of controlling includes the step of differentially heating the air in said region.

18. The method defined in claim 17 wherein said step of differentially heating includes the step of controlling the heating to produce a Fresnel atmospheric lens.

19. The method defined in claim 1 wherein said step of modulating includes the step of ionizing air in said region.

20. The method defined in claim 1, further comprising the steps of:

providing an internally reflecting tube having an inlet aperture at one end and an output aperture at an opposite end;

effectively tapering forward propagating rays of the concentrated solar radiation at said inlet aperture of said tube;

guiding the concentrated solar radiation along said tube to said outlet aperture; and directing the concentrated solar radiation from said outlet aperture to a preselected point.

21. The method defined in claim 20, further comprising the step of focusing the concentrated solar radiation leaving said tube at said outlet aperture.

22. The method defined in claim 20, further comprising the step of extending said tube through a bore in the earth.

23. The method defined in claim 20 wherein said step of directing includes the step of bending the tube.

24. A method for shading a predetermined area from the effects of solar radiation, comprising the steps of:

generating waveform energy;

directing said energy to a predetermined region of the atmosphere located a pre-established distance above a surface of the earth;

controlling said step of directing to modulate an index of refraction of air in said predetermined region of the atmosphere to produce a predetermined refraction index pattern in said region; and modifying a distribution of solar radiation passing through said region to thereby divert at least a portion of the incoming solar radiation from falling within a predetermined area.

25. The method defined in claim 24, further comprising the step of cooling said area as a result of said step of modifying.

26. A method for concentrating solar energy, comprising the steps of:

generating waveform energy;

guiding liquid to flow in a plane along a preestablished path;

directing said energy to a predetermined region of said pre-established path;

controlling said step of directing to modulate an index of refraction of said liquid in said predetermined region of said pre-established flow path to produce a predetermined refraction index pattern of said liquid in said region; and modifying the distribution of solar radiation passing through said region to thereby concentrate the solar radiation at a predetermined location.

27. The method defined in claim 26 wherein said waveform energy is electromagnetic radiation and said step of generating includes the step of generating said electromagnetic radiation via a laser, said step of controlling including the step of concentrating the laser generated radiation differentially throughout said region.

28. The method defined in claim 26 wherein said step of controlling includes the step of differentially heating the liquid in said region.

29. The method defined in claim 28 wherein said step of differentially heating includes the step of controlling the heating to produce a Fresnel lens.

30. The method defined in claim 26 wherein said liquid is a glycol.

31. The method defined in claim 26 wherein said liquid is an oil.

32. The method defined in claim 26 wherein said step of guiding includes the steps of providing a planar support and guiding said liquid to flow along said support.

33. The method defined in claim 26 wherein said step of guiding includes the steps of providing a nozzle with an elongate mouth and dispensing said liquid through said mouth so that said liquid falls in a planar sheet.

* * * * *